A. D. BALDWIN.
SICKLE BAR FOR MOWING MACHINES.
APPLICATION FILED FEB. 1, 1916.

1,212,880.

Patented Jan. 16, 1917.
2 SHEETS—SHEET 1.

Witnesses

Inventor
A. D. Baldwin
By
Attorneys

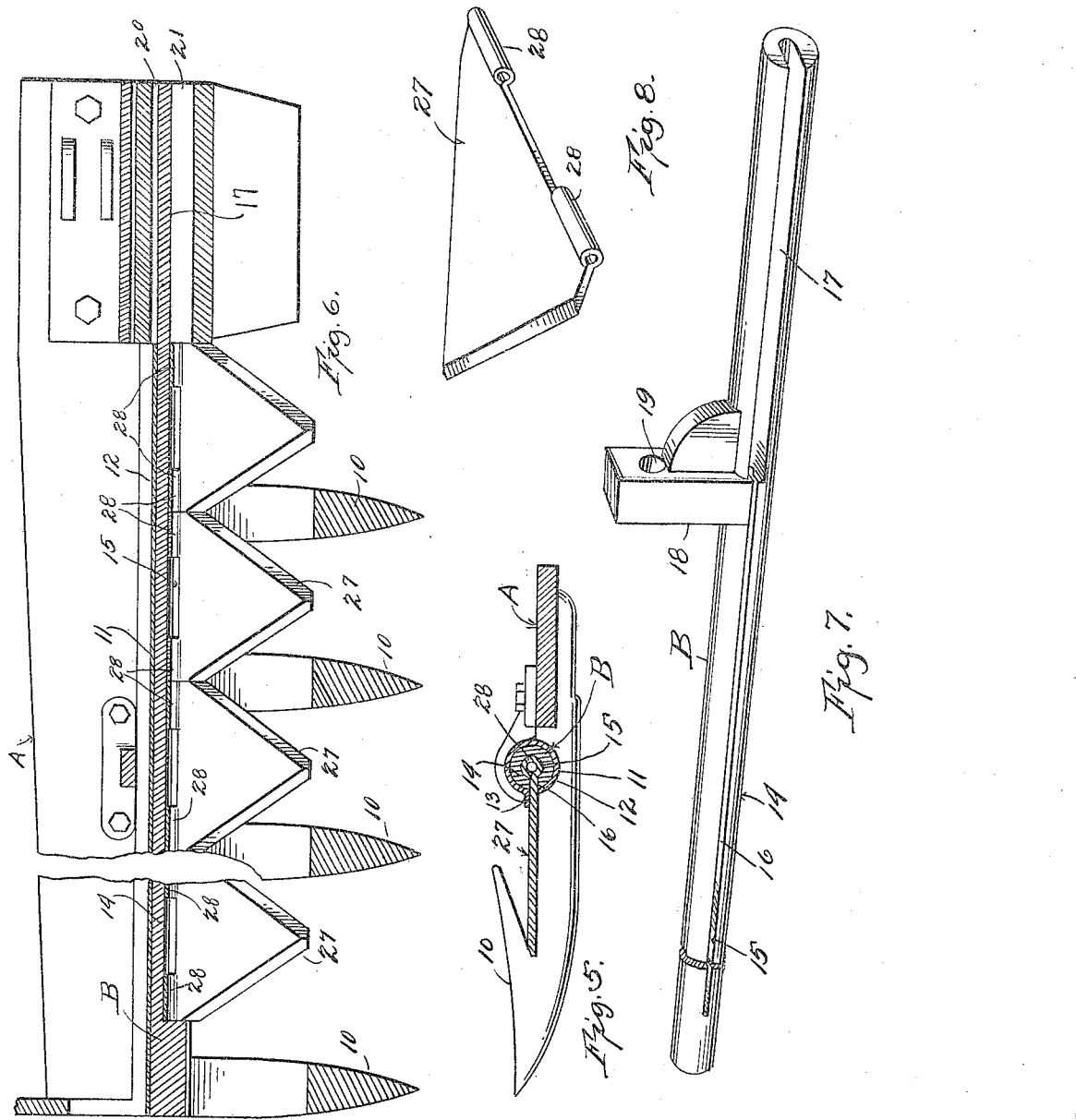

UNITED STATES PATENT OFFICE.

ALONZO D. BALDWIN, OF LATHAM, KANSAS.

SICKLE-BAR FOR MOWING-MACHINES.

1,212,880. Specification of Letters Patent. Patented Jan. 16, 1917.

Application filed February 1, 1916. Serial No. 75,592.

*To all whom it may concern:*

Be it known that I, ALONZO D. BALDWIN, a citizen of the United States, residing at Latham, in the county of Butler, State of Kansas, have invented certain new and useful Improvements in Sickle-Bars for Mowing-Machines; and I do hereby declare the following to be a full, clear, and exact description of the invention, such as will enable others skilled in the art to which it appertains, to make and use the same.

This invention relates to sickle bars for mowing machines.

The object of the invention is to provide a sickle bar in which the knives are formed separately and held in assembled relation through the medium of a novel structure which will permit the knives to be removed and replaced with facility as occasion may require.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
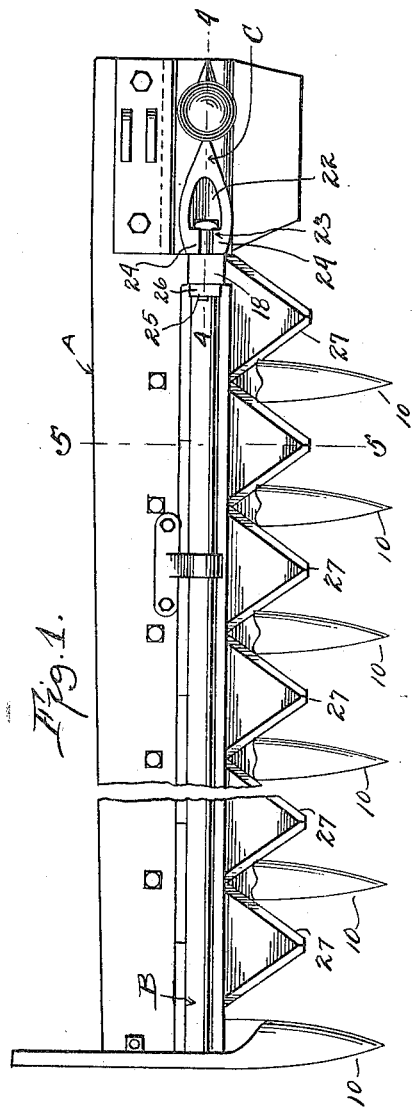
Figure 2:
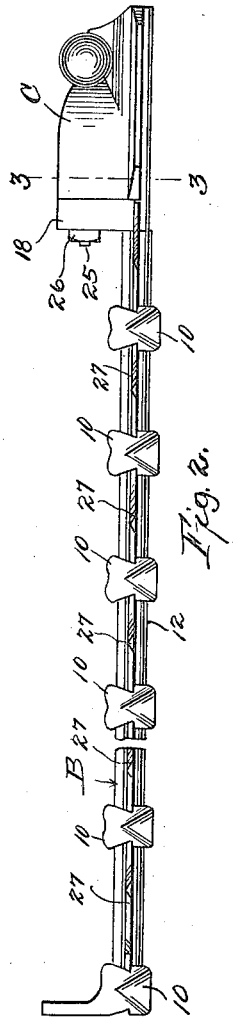
Figure 3:
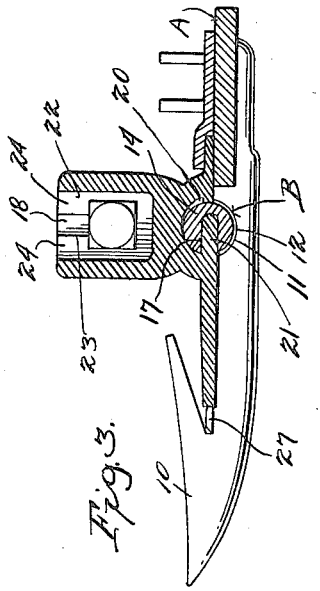
Figure 4:
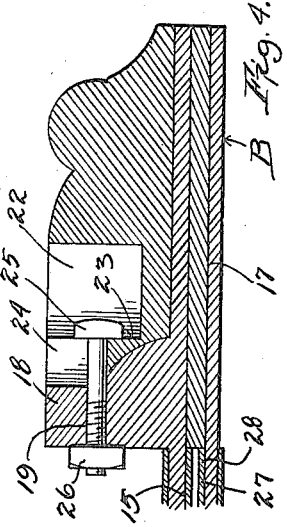

Figure 1 is a plan view of a sickle bar constructed in accordance with the invention; Fig. 2, a front view of what is shown in Fig. 1; Fig. 3, a section on the line 3—3 of Fig. 2; Fig. 4, a section on the line 4—4 of Fig. 1; Fig. 5, a section on the line 5—5 of Fig. 1; Fig. 6, a horizontal section through the knife bar; Fig. 7, a perspective view of the knife bar removed from the finger bar, and Fig. 8, a perspective view of one of the knives detached.

Referring to the drawings A indicates generally the finger bar and B the knife bar. The finger bar A embodies the usual guard fingers 10 and is provided with a longitudinal groove 11 having a metallic liner 12 one edge of which projects through the mouth of the groove to form a holding lip 13 for a purpose that will presently appear.

The knife bar B comprises a rod 14 slidable in the liner 12. This rod is provided with a recess 15 extending throughout substantially its entire length and having a contracted mouth 16 opening through the side of the rod 14. At one end of the rod the mouth of the recess 15 is widened considerably as at 17. Formed on the rod 14 is an upstanding lug 18 provided with a bolt passage 19 extending parallel to the rod 14. The knife bar further embodies a head C having a longitudinal groove 20 opening through the bottom thereof, the mouth of said groove being contracted and forming a tongue 21. One end of the rod 14 is engaged in the groove 20 whereby the rod 14 is held against rotation relative to the head C. This head C is provided with a recess 22 opening through the top of the head and through one end thereof. A portion of this recess is reduced as at 23 to form shoulders 24. Engaged in the reduced portion 23 of the recess is the shank of a bolt 25, the head of said bolt being adapted to engage against the shoulders 24. This bolt extends through the passage 19 and has threaded thereon the usual nut 26 which when screwed home binds the rod 14 to the head C for reciprocation with the latter in the usual manner as will be obvious.

The knives of the knife bar are indicated at 27 and are provided at their rear ends with rolled portions 28 which are slidably engaged in the large or inner end of the recess 15. The roll portion 28 adjacent the inner end of the tongue 21 is engaged by said tongue so that when the nut 26 is screwed on the bolt the knives 27 will be firmly bound together end to end.

From the foregoing construction it will be obvious that the knife bar can be assembled and taken apart without the use of any tools except a wrench and without employing rivets to hold the knives in assembled relation.

What is claimed is:—

The combination with a finger bar having recesses in the fingers thereof, a rod in the recesses, said rod being provided with a recess opening through the side and one end thereof, said recess having a contracted mouth, a metallic lining in the recesses of the fingers surrounding the rod and including the holding lip, a plurality of knives projecting through the mouth of the rod and having enlarged inner ends disposed in the recess of the rod, the holding lip of the lining bearing against the upper sides of said knives to support same against a tendency to move upward, a head having a tongue slidable in the recess in the rod and adapted to bear against the end knife, and means for adjusting the head longitudinally of the rod to bind the knives against each other end to end.

In testimony whereof, I affix my signature, in the presence of two witnesses.

ALONZO D. BALDWIN.

Witnesses:
W. M. HEDRICK,
MAY CORBIN RANKIN.

Copies of this patent may be obtained for five cents each, by addressing the "Commissioner of Patents, Washington, D. C."